Oct. 6, 1942.   J. A. SENN ET AL   2,297,991
CONTROL OF ELECTRIC CIRCUITS
Filed Aug. 1, 1940
Fig. 1
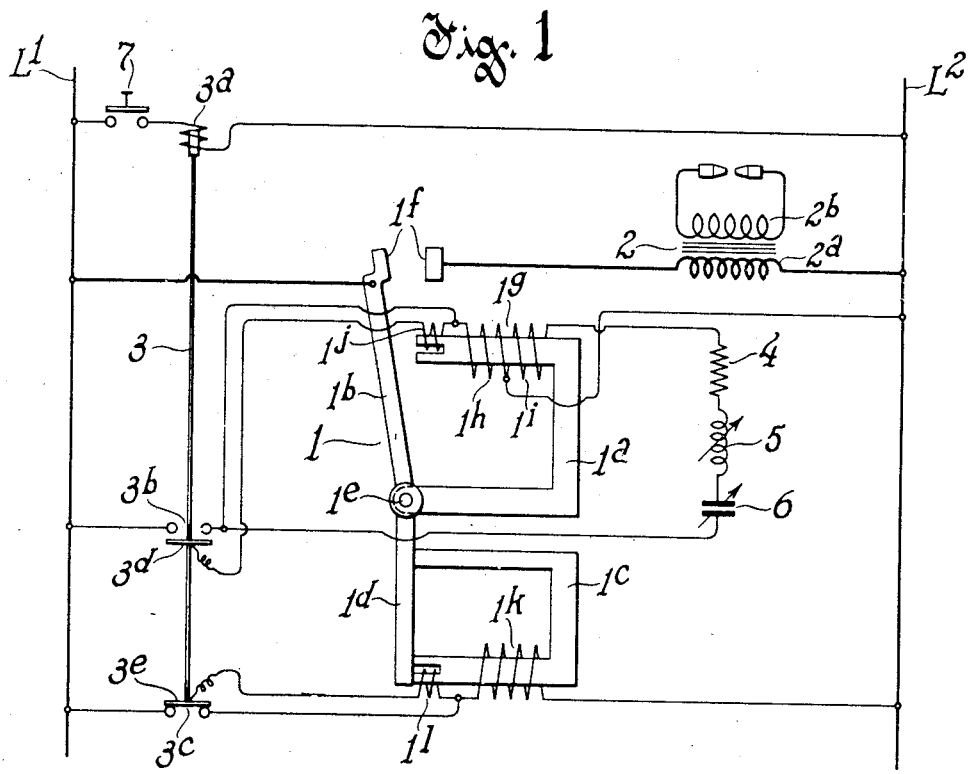
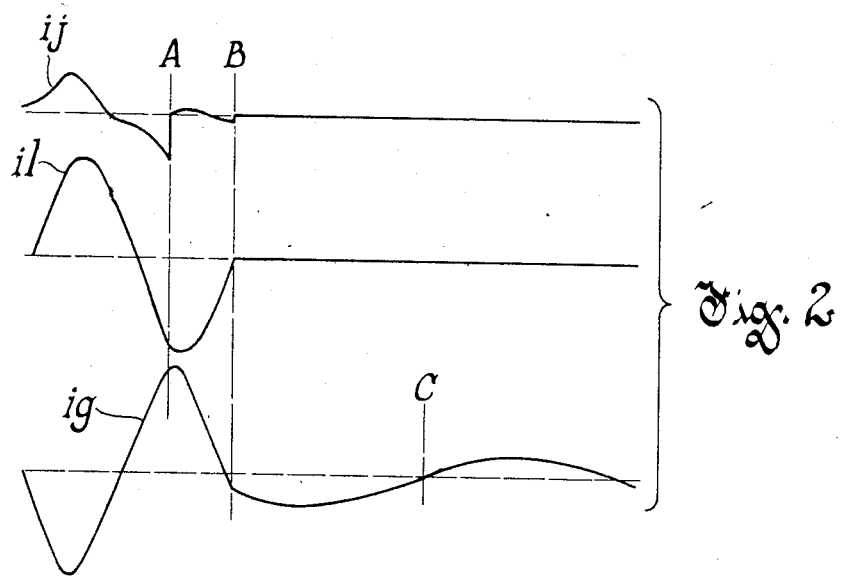
Fig. 2
Inventors
Jurg A. Senn
Carroll Stansbury
By Frank H. Hubbard
Attorney Patented Oct. 6, 1942

2,297,991

UNITED STATES PATENT OFFICE 2,297,991

CONTROL OF ELECTRIC CIRCUITS

Jurg A. Senn, Milwaukee, and Carroll Stansbury, Wauwatosa, Wis., assignors to Cutler-Hammer, Inc., Milwaukee, Wis., a corporation of Delaware Application August 1, 1940, Serial No. 349,206

14 Claims. (Cl. 175—375)

This invention relates to the control of electric circuits and is particularly applicable to the synchronization of the operation of electromagnetic switches which in turn control translating circuits.

An object of the invention is to provide a controller in which the moment of closure of a translating circuit can be accurately timed with respect to the time-phase of the alternating supply voltage.

Another object is to provide a controller in which the moment of opening of the translating circuit can be controlled with respect to the time phase of the current flow in said circuit.

Another object is to provide a controller the moment of opening and/or closure of which is accurately controlled.

Another object is to provide a controller in which the time of opening and/or closure of a translating circuit thereby may be easily adjusted to meet various operating conditions.

Other objects and advantages will hereinafter appear.

The accompanying drawing is illustrative of an embodiment of the invention.

In the drawing,

Figure 1 is a circuit diagram of a system embodying the invention, and

Fig. 2 is a diagram showing the instantaneous currents flowing in various circuits of the system shown in Fig. 1.

Referring to Fig. 1, the same illustrates an alternating current supply circuit, having the lines $L^1$ and $L^2$ from which energy may be supplied through an electromagnetic switch 1 to a welding transformer 2. The switch 1 in turn is controlled by an electromagnetic relay 3 energizable through a normally open pushbutton switch as will be explained hereinafter.

The electromagnetic switch 1 comprises a main magnet frame $1^a$ and a cooperating pivoted armature $1^b$, an auxiliary or lock-out magnet frame $1^c$ and a cooperating armature $1^d$. The armatures $1^b$ and $1^d$ are integrally united at a predetermined angle relatively to each other, and are pivoted about a pivot $1^e$. The lever $1^b$ controls a pair of normally open main contacts $1^f$. A main magnetizing coil $1^g$ comprises two series connected sections $1^h$ and $1^i$, preferably surrounding the upper pole of frame $1^a$. The upper pole of frame $1^a$ is also provided with a shading coil winding $1^j$ which is interlinked with only a part of the pole face in the usual manner.

The lock-out magnet frame $1^c$ is provided with a main magnetizing coil $1^k$ which preferably surrounds the lower pole, and said lower pole is provided with a shading coil winding $1^l$ which is interlinked with only a part of the face of said pole. The coils $1^k$ and $1^l$ are connected in series with each other.

The translating circuit 2 comprises a welding transformer having a primary winding $2^a$ and a secondary winding $2^b$. The relay 3 comprises an energizing winding $3^a$, a normally open double-break contact $3^b$ and a normally closed double-break contact $3^c$. The double-break of contacts $3^b$ and $3^c$ is provided by use of bridging members $3^d$ and $3^e$, respectively.

The system is connected as follows: A circuit is adapted to be completed from line $L^1$ through a normally open pushbutton switch 7, energizing coil $3^a$ to line $L^2$. Upon energization of relay 3 another circuit extends from line $L^1$ through contacts $3^b$ and member $3^d$, section $1^h$ of coil $1^g$ to line $L^2$, while the entire coil $1^g$ is included in a circuit or loop comprising a resistor 4, a variable reactor 5 and a condenser 6. The left-hand terminal of the section $1^h$ of coil $1^g$ which is common with one terminal of the condenser 6 is connected to the right-hand one of the contacts $3^b$, while the bridging member $3^d$ is connected to one terminal of the shading coil $1^j$. The contact lever $1^b$ is connected to the line $L^1$ which is thus connected to the movable member of the contacts $1^f$, the stationary member of said contacts $1^f$ being connected through winding $2^a$ of transformer 2 to line $L^2$.

During deenergization of relay 3 a circuit extends from line $L^1$ through contacts $3^c$, member $3^e$ and winding $1^k$ to line $L^2$, while the shading coil $1^l$ has one of its terminals connected to the right-hand one of the stationary contacts $3^c$ and its other terminal of said coil $1^l$ is connected with the bridging member $3^e$ so that the shading coil is short-circuited when contacts $3^c$ are bridged by member $3^e$.

The system operates as follows: With the lines $L^1$ and $L^2$ energized a current flows from line $L^1$ through the coil $1^k$ to line $L^2$ thereby attracting the armature $1^d$ and holding the switch 1 in a normally open position. The flux induced in the frame $1^c$ also energizes the shading coil $1^l$ which is short-circuited through the right-hand contact $3^c$ and member $3^e$ so that a current flows therein which produces a magnetic flux which is out of phase with the main flux.

If it is now desired to energize the translating circuit the push button 7 is depressed thus energizing relay coil $3^a$ which opens normally closed contacts 3ᶜ and closes normally open contacts 3ᵇ. Closure of contacts 3ᵇ completes a circuit through the coil section 1ʰ to energize the closing magnet, the current being sufficient to close the switch after the restraint of the lock-out magnet 1ᶜ is removed. The opening of contacts 3ᶜ first removes the short-circuit of the shading coil 1ʲ and as the voltage of this circuit is very low said shading coil is rendered ineffective instantly upon response of the relay 3, while an arc is formed upon and persists for an interval between the contacts 3ᶜ and member 3ᵉ, thereby maintaining a current flow from line L¹ through the left-hand contact 3ᶜ, bridging member 3ᵉ, the shading coil 1ʲ, the main magnet winding 1ᵏ to line L². The current then flowing through the shading coil 1ʲ is only a small fraction of the normal shading coil current flowing therein, so that it is substantially ineffective to maintain a pull on the lock-out coil when the current in 1ᵏ passes through zero with consequent extinguishment of the arc, and the lock-out magnet thereupon releases and the switch closes under the influence of the pull of the closing winding 1ʰ.

It will thus be observed that the initial movement of the magnet closure takes place at a given moment of the alternating voltage impressed upon the lines L¹ and L², and inasmuch as the time element of the switch is substantially constant the contacts 1ᶠ close and thus energize the transformer 2 at a given time-phase of the alternating voltage.

If after the switch 1 has closed its contacts 1ᶠ it is desired to again open the same the push button switch 7 is released thereby deenergizing the relay coil 3ᵃ which in turn opens the contacts 3ᵇ and closes the contacts 3ᶜ. The lock-out magnet 1ᶜ is designed in such a manner that its pull very rapidly decreases upon movement of the armature 1ᵈ away from the magnet frame 1ᶜ so that with the switch 1 closed the pull of the lock-out magnet is insufficient to substantially affect the opening of the switch 1. Upon opening of the contacts 3ᵇ the short-circuit on the shading coil 1ʲ is opened as has been explained heretofore in connection with the shading coil 1ʲ.

Also after a brief moment the current through the coil section 1ʰ ceases flowing because of interruption of the arc which forms between the contacts 3ᵇ and member 3ᵈ upon disengagement of the latter from the former. However, the values of resistance 4, inductance 5 and capacity 6 being coordinated in such a manner as to form with coil 1ᵍ an oscillatory circuit cause continued energization of the coil 1ᵍ after cessation of current flow from the line. This maintains the magnet frame 1ᵃ energized and the armature 1ᵇ in the attracted position until the current in said oscillating circuit passes through zero value, whereupon the armature 1ᵇ, under the influence of gravity and any other forces that may be applied thereto, begins to retract thereby quickly modifying the constant of the oscillatory circuit, so that the energy therein is quickly dissipated, with consequent opening of contacts 1ᶠ of switch 1. By proper adjustment of the inductance of reactor 5 and/or condenser 6 the time constant of the oscillatory circuit may be varied to open the contacts 1ᶠ at any desired time phase of the current flowing in the translating circuit.

Fig. 2 shows the currents and voltages in certain parts of the circuit. In Fig. 2 curve $ij$ indicates the value of current in the shading coil circuit which suddenly is reduced to a very small value upon the beginning of the disengagement of member 3ᵈ from the contacts 3ᵇ at the moment A.

The line current which flows from the line through the entire coil circuit is represented by curve $il$, said current passing through zero value at the moment B when the arc formed between the contacts 3ᵇ and member 3ᵈ is extinguished.

The curve $ig$ represents the current flowing in the oscillating circuit, said current having a given effective value while the winding 1ᵍ (Fig. 1) is energized by line current and receding to a lower value at the moment B upon the cessation of current flow from the line through the contacts 3ᵇ and member 3ᵈ. When the value of current $ig$ (Fig. 2) again passes through zero at the moment C the armature 1ᵇ starts to retract.

The flux created in magnet frame 1ᵃ upon reappearance of current therein after the moment C is insufficient to reclose the switch contacts 1ᶠ, largely due to the absence of any effective pull from the coil 1ʲ. The interval between the moment C and stoppage of current flow through contacts 1ᶠ depends upon the inertia of the movable parts of the switch 1 and the electrical constants of the translating circuit.

It will be understood that the circuit arrangement shown in connection with the closing magnet 1ᵃ may also be applied to the lock-out magnet 1ᶜ in place of the circuit arrangement for the latter shown in the drawing. By an arrangement such as that just described the moment of closure of the switch contacts 1ᶠ may be more accurately timed and adjusted than with the system as illustrated.

It is further apparent that the lock-out magnet frame 1ᶜ and its related circuits may be entirely omitted, in which case only the opening of the switch contacts 1ᶠ is controlled in the manner aforedescribed.

What we claim as new and desire to secure by Letters Patent is:

1. An electromagnetic switch adapted to control an alternating current translating circuit, comprising an electromagnet, a main winding adapted to induce a flux in said magnet, a shading coil mounted on said magnet, and means to short-circuit said shading coil upon itself and to connect said main winding to a source of alternating current and to alternatively open said short-circuit and thereafter disconnect said main winding from said source.

2. An electromagnetic switch adapted to control an alternating current translating circuit, comprising an electromagnet having a frame and an armature, a main winding adapted to induce a flux in said magnet, a shading coil mounted on said magnet, and means to short-circuit said shading coil upon itself and to connect said main winding to a source of alternating current and to alternatively open said short-circuit and thereafter disconnect said main winding from said source.

3. An electromagnetic switch adapted to control an alternating current translating circuit, comprising an electromagnet, a main winding adapted to induce a flux in said magnet, a shading coil mounted on said magnet means to short-circuit said shading coil upon itself and to connect said main winding to a source of alternating current and to alternatively open said short-circuit and thereafter disconnect said main winding from said source, and an oscillating circuit connected to said main winding and adapted to temporarily maintain said flux after said main winding is disconnected from said source.

4. An electromagnetic switch adapted to control an alternating current translating circuit, comprising an electromagnet, a main winding adapted to induce a flux in said magnet, a shading coil mounted on said magnet, means to short-circuit said shading coil upon itself and to connect said main winding to a source of alternating current and to alternatively open said short-circuit and thereafter disconnect said main winding from said source, and an adjustable oscillating circuit connected to said main winding and adapted to maintain said flux after said main winding is disconnected from said source and until the alternating current reaches a given phase of its cycle.

5. An electromagnetic switch adapted to control an alternating current translating circuit, comprising a pair of cooperating contacts connectable to a translating circuit, an electromagnet, a main winding adapted to induce a flux in said magnet to effect closure of said contacts, a shading coil mounted on said magnet, and means to short-circuit said shading coil upon itself and to connect said main winding to a source of alternating current and to alternatively open said short-circuit and thereafter disconnect said main winding from said source.

6. An electromagnetic switch adapted to control an alternating current translating circuit, comprising a pair of cooperating contacts connectable to a translating circuit to control the same, a pair of electromagnets adapted when energized to effect the opening and the closing of said contacts respectively, each electromagnet being provided with a main winding adapted to induce a flux therein, each electromagnet also having a shading coil, means individual to each magnet to short-circuit its shading coil upon itself and to connect its main winding to a source of alternating current and to alternatively open said short-circuit and thereafter disconnect the respective main winding from said source.

7. An electromagnetic switch adapted to control an alternating current translating circuit comprising, a pair of cooperating contacts, an electromagnet adapted to effect closure of said contacts, and a lock-out electromagnet adapted to maintain said contacts open, each of said magnets having a main winding adapted to induce a flux therein and a shading coil, means individual to each of said magnets adapted to short-circuit its shading coil upon itself and to connect its main winding to a source of alternating current and to alternatively open said short-circuit and to thereafter disconnect said main winding from said source, and an adjustable oscillating circuit connected to the main winding of said first mentioned magnet and adapted to maintain the flux therein after said main winding is disconnected from said source and until the alternating current in the translating circuit reaches a given phase of its cycle.

8. An electromagnetic switch adapted to control an alternating current translating circuit, comprising a pair of cooperating contacts, a closing electromagnet and a lock-out electromagnet, each of said magnets having a main winding adapted to induce a flux therein and a shading coil, means individual to each of said magnets adapted to short-circuit the respective shading coil upon itself and to connect the main winding to a source of alternating current and to alternatively open said short-circuit and to thereafter disconnect said main winding from said source, an adjustable oscillating circuit connected to the main winding of said closing magnet and adapted to maintain the flux therein after said main winding is disconnected from said source and until the alternating current in the translating circuit reaches a given phase of its cycle, and means to energize one and deenergize the other of said magnets alternately.

9. An electromagnetic switch adapted to control an alternating current translating circuit, comprising an electromagnet, a main winding having a portion adapted when energized to induce a flux in said electromagnet, a shading coil mounted on said magnet, means to short-circuit said shading coil upon itself and to connect said portion of said main winding to a source of alternating current and to alternatively open said short-circuit and thereafter disconnect said portion of said main winding from said source, and an adjustable oscillating circuit connected in series relation with the entire main winding in the form of a closed loop and adapted to maintain said flux after said portion of said main winding is disconnected from said source and until the alternating current reaches a given phase of its cycle.

10. An electromagnetic switch adapted to control an alternating current translating circuit, comprising an electromagnet, a main winding having a portion adapted when energized to induce a flux in said electromagnet, a shading coil mounted on said magnet, means to short-circuit said shading coil upon itself and to connect said portion of said main winding to a source of alternating current and to alternatively open said short-circuit and thereafter disconnect said portion of said main winding from said source, and an adjustable oscillating circuit connected in series relation with the entire main winding in the form of a closed loop and adapted to maintain said flux after said portion of said main winding is disconnected from said source and until the alternating current reaches a given phase of its cycle, said oscillating circuit including a resistance, a reactance and a capacitance electrically connected in series relationship to each other.

11. An electromagnetic switch adapted to control an alternating current translating circuit, comprising an electromagnet, a main winding having a portion adapted when energized to induce a flux in said electromagnet, a shading coil mounted on said electromagnet, means to short-circuit said shading coil upon itself and to connect said portion of said main winding to a source of alternating current and to alternatively open said short-circuit and thereafter disconnect said portion of said main winding from said source, an adjustable oscillating circuit connected in series relation with the entire main winding in the form of a closed loop and adapted to maintain said flux after said portion of said main winding is disconnected from said source and until the alternating current reaches a given phase of its cycle, said oscillating circuit including a resistance, a reactance and a capacitance electrically connected in series relationship to each other, and said reactance and said capacitance having means individual thereto to vary the effective values thereof at will.

12. An electromagnetic switch adapted to control an alternating current circuit for welding or the like, comprising a set of normally open contacts, a closing electromagnet and a lock-out electromagnet associated with said contacts, each of said electromagnets having a main winding adapted to induce a flux therein and a shading coil, means individual to each of said magnets adapted to short-circuit the respective shading coil upon itself and to connect the main winding to a source of alternating current and to alternatively open said short-circuit and to thereafter disconnect said main winding from said source, an adjustable oscillating circuit connected in series with the main winding of said closing magnet in the form of a closed loop and adapted to maintain the flux therein after said main winding is disconnected from said source and until the alternating current in the translating circuit reaches a given phase of its cycle, said oscillating circuit including a resistance, a reactance and a capacitance electrically connected in series relationship to each other, and means subject to manual control to simultaneously initiate energization of one and deenergization of the other of said electromagnets, and vice versa.

13. An electromagnetic switch adapted to control an alternating current circuit for welding or the like, comprising a set of normally open contacts, a closing electromagnet and a lock-out electromagnet associated with said contacts, each of said electromagnets having a main winding adapted to induce a flux therein and a shading coil, means individual to each of said magnets adapted to short-circuit the respective shading coil upon itself and to connect the main winding to a source of alternating current and to alternatively open said short-circuit and to thereafter disconnect said main winding from said source, an adjutable oscillating circuit connected in series with the main winding of said closing magnet in the form of a closed loop and adapted to maintain the flux therein after said main winding is disconnected from said source and until the alternating current in the translating circuit reaches a given phase of its cycle, said oscillating circuit including a resistance, a reactance and a capacitance electrically connected in series relationship to each other, and reactance and said capacitance having means individual thereto to vary the effective values thereof at will, and means subject to manual control to simultaneously initiate energization of one and deenergization of the other of said electromagnets, and vice versa.

14. An electromagnetic switch adapted to control an alternating current circuit for welding or the like, comprising a set of normally open contacts, a closing electromagnet and a lock-out electromagnet associated with said contacts, said closing electromagnet having a main winding a portion of which is adapted when energized to induce a flux in said electromagnet, said lock-out electromagnet having a main winding adapted when energized to induce a flux therein, each of said electromagnets having a shading coil, means associated with said electromagnets jointly, said means being operable to short-circuit upon itself the shading coil of said closing electromagnet and to simultaneously connect said portion of the main winding thereof to a source of alternating current, said means being operable alternatively to short-circuit upon itself the shading coil of said lock-out electromagnet and to simultaneously connect the main winding thereof to said source of alternating current, an oscillating circuit in the form of a closed loop adapted to maintain the flux in said closing electromagnet after said portion of the main winding thereof is disconnected from said source and until the alternating current in the first mentioned circuit reaches a given phase of its cycle, said oscillating circuit including a resistance, a variable reactance and a variable condenser electrically connected in series relationship to each other and to the entire main winding of said closing electromagnet, and said means associated with said electromagnets jointly being subject to control by a single manually operable switch to simultaneously initiate energization of one and deenergization of the other of said electromagnets, and vice versa.

JURG A. SENN.
CARROLL STANSBURY.